United States Patent Office 3,369,405
Patented Feb. 20, 1968

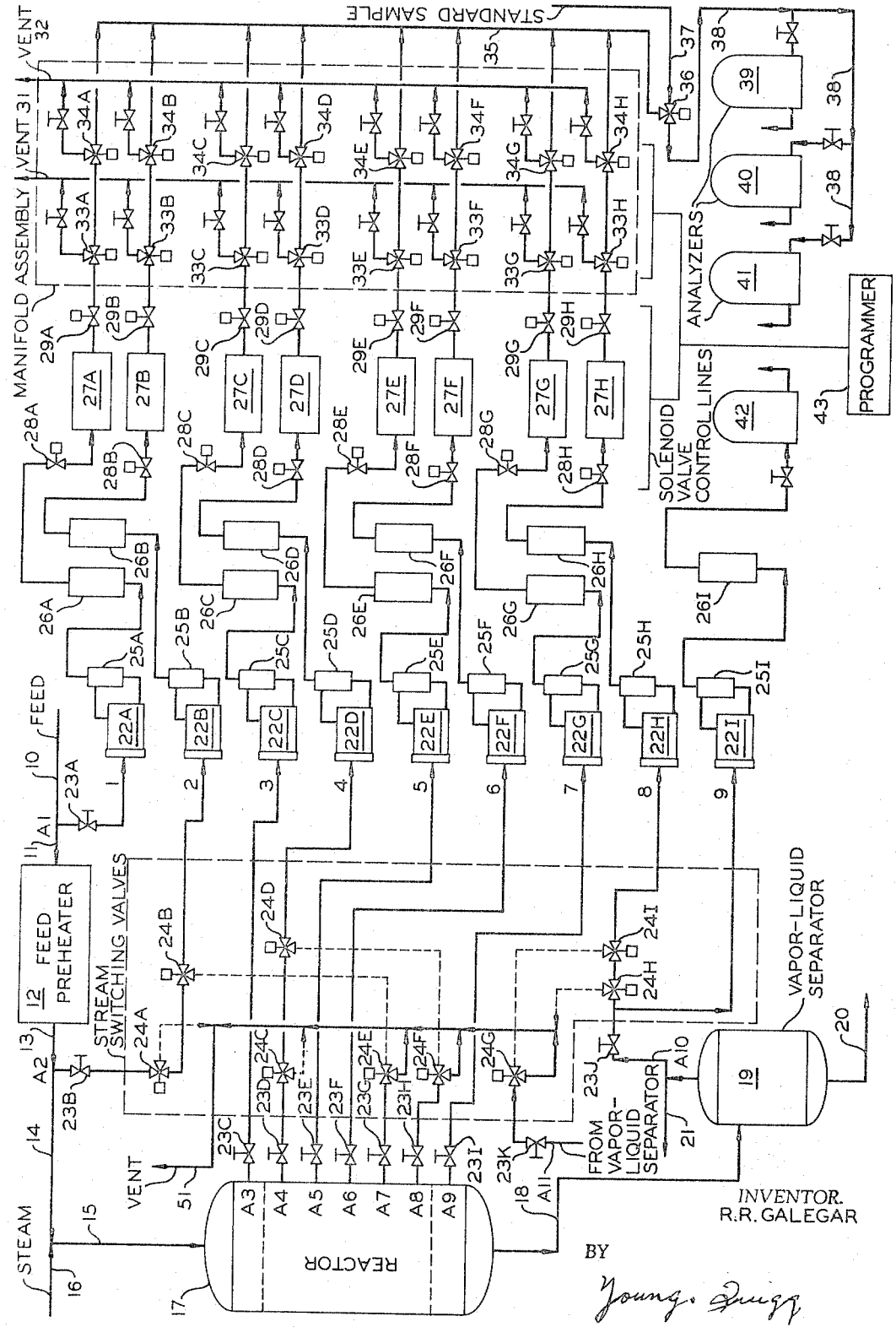

3,369,405
SAMPLING SYSTEM
Robert R. Galegar, Bartlesville, Okla., assignor to Phillips Petroleum Company, a corporation of Delaware
Filed Nov. 3, 1964, Ser. No. 408,633
7 Claims. (Cl. 73—421)

ABSTRACT OF THE DISCLOSURE

A system for obtaining an analytical profile across a process stream wherein a plurality of samples are simultaneously taken at different locations within the process, each being then separately stored in a separate container. The samples are then sequentially analyzed by a single analyzer. A cross section of the composition of the process materials is thus obtained for the instant that the samples were taken.

Method for obtaining an analytical profile across a process system comprising obtaining a plurality of sample streams simultaneously from the process, separately storing each sample stream and sequentially analyzing the individually stored samples to obtain the analytical profile; and apparatus for trapping a plurality of samples which are collected simultaneously for subsequent individual analysis by means of a system of solenoid valves and tanks.

This invention relates broadly to an instrument sampling system. In another aspect, it relates to a method and apparatus for simultaneously collecting a plurality of sample streams for later analysis. In accordance with another aspect, this invention relates to method and apparatus for a sampling system for taking a plurality of samples simultaneously, treating and storing all the samples obtained, and then analyzing the samples sequentially. In a further aspect, it relates to a system whereby a plurality of samples are collected and trapped or stored simultaneously and analyzed at some later time sequentially so all samples would represent a condition or composition at the same instant of time. In a further aspect, this invention relates to a system of solenoid valves adapted for simultaneous opening of a plurality of sampling lines to collect a plurality of samples and a system of solenoid valves adapted to sequentially pass the individual collected samples to analysis.

In various industrial operations it is desirable to analyze sample streams from a plurality of process streams or containers. Such analyses can often be made by means of a single analyzer which is supplied with samples from the several process streams in sequence. Various types of sampling systems have been developed for this purpose.

In the past, it has been customary to manually obtain gas samples at the various sampling points and then to analyze these samples with a conventional analyzing apparatus. While this type of sampling and analyzing produces a highly accurate analysis of the gas at each sampling point, it is unsatisfactory due to the time consumed in manually scanning the various sampling points. For example, if the reaction conditions in a process should change during the test or sampling operation, some of the samples will be taken under different conditions and substantially affect the accurate determination of the composition or conditions of a process.

In accordance with the present invention, there is provided an improved system for obtaining samples from a plurality of process streams or containers or other desired points whereby a plurality of samples are collected simultaneously for subsequent individual sequential analysis.

Accordingly, it is an object of this invention to provide an improved fluid stream analyzing system.

A further object is to provide a fluid sampling system which permits samples from a plurality of process streams or containers to be directed to an analyzer in any desired sequence.

Another object of this invention is to simultaneously sample and sequentially analyze a plurality of sample streams with a single analyzing apparatus.

Other objects, aspects as well as the several advantages of the invention will become apparent from the specification, the drawing and the appended claims.

In accordance with the invention, method and apparatus are provided for obtaining an analytical profile across a process system which comprises simultaneously obtaining a plurality of sample streams from the process, treating each sample stream to remove contaminants therefrom, separately storing each sample stream and sequentially analyzing the individual stored sample streams to obtain the analytical profile.

The invention is particularly adapted to the withdrawal and preparation of liquid and vapor streams removed from a chemical process for subsequent analysis by process monitors and control instruments such as mass spectrometers, infrared analyzers, refractometers, or other composition-determining insturments as well as chromatographic analyzers. In one embodiment of the invention, there is provided a particularly useful method for obtaining an analytical profile across an entire process system such as a $C_4$ hydrocarbon dehydrogenation process.

A more complete understanding of the invention can be had by reference to the accompanying drawing which is a flow diagram in accordance with the invention showing one arrangement of apparatus for effecting the sampling, treating, storing and analyzing.

Referring now to the drawing, a dehydrogenation feed is passed by way of lines 10 and 11 and introudced into feed preheater 12. In the dehydrogenation process, the feed can suitably comprise butene and/or butane as well as other materials. The preheated feed is then passed by way of lines 13, 14, and 15 and introduced into the top of reactor 17. Superheated steam is introduced into the feed by way of line 16 or by other suitable means in a quantity and at a temperature as may be beneficial to the process.

Reactor 17 contains a bed of catalyst effective for the dehydrogenation of butene and/or butane to butadiene and/or butene. One suitable catalyst for butene dehydrogenation is iron oxide-potassium carbonate-chromium oxide as described in U.S. Patent No. 2,866,790. Other catalysts known for $C_4$ hydrocarbon dehydrogenation can likewise be employed. Within reactor 17 the feed material introduced by way of line 15 is subjected to dehydrogenation conditions to convert some butane to butene and butadiene, but principally butene to butadiene. The reaction effluent is removed by way of line 18 and passed through quenching, heat recovery and cooling steps (not shown) to vapor-liquid separator 19. Liquid (principally steam condensate) is removed from the base of separator 19 by way of line 20 for further processing as desired. An overhead $C_4$ hydrocarbon vapor stream is removed by way of line 21 for further processing as desired.

In accordance with the invention, the sampling system comprises a plurality of sampling points or probes A1–A11 which are connected to a plurality of conduits extending between the sampling point and the moisture separator identified by 22A–22I, with streams A2, A4, A7, A8, A19 and A11 being also connectable, alternatively with vent 51. The sampling points from the inlet condiuts, from the reactor and from the effluent conduits are connected to the moisture separators by conduits identified 1–9, the sampling lines. Each of the sampling lines is provided with a block valve identified 23A–23K. Each of these block valves is positioned between a sampling point A1–A11 and a moisture separator 22A–22I and/or a solenoid valve 24A–24I.

This plurality of solenoid valves 24A–24I serves to control communication between three pairs of sampling points A2–A7, A4–A8, A10–A11 and three water or moisture separators 22B, 22D and 22H, respectively. These solenoid valves are arranged to establish communication via the solid lines from sample points A–2, A–4 and A–10 to separators 22B, 22D and 22H, respectively when energized, and to prevent these communications and to establish other communications from sample points A7, A8 and A11 respectively when deenergized. The solenoid valves 24A–24I are simultaneously energized to choose the desired three of the six possible sampling points to be in communication with separators 22B, 22D and 22H.

The embodiment illustrated in the drawing permits collection of nine samples for analysis from eleven different process sample points, five or six of which are taken from within reactor 17. Three of the sample streams, namely the streams from sample points A2, A4 and A10 are multiplexed to allow manual selection of three alternate streams (A7, A8 and A11 respectively) for analysis when desired. The system illustrated in the drawing limits the maximum number of samples that can be prepared at any one time to nine, but this is governed only by the complexity of the system under consideration and any number of sampling points can be employed when desired. Sampling lines running from sample points A2, A4, A7, A8, A10 and A11 are connectable to vent 51 as desired. Samples from points A1 and A10 are always taken via separators 22A and 22I respectively, and A–10 may also be sampled via separator 22H so as to allow analysis for additional components as will be described below.

Each sample stream withdrawn from a sample point is passed through a water knock-out pot or moisture trap 22A–22I where the free water and any solid material are separated from the sample stream. The water and solid material can be dumped to drain through a float actuated valve not shown. The sample is passed from the moisture separator through coalescer 25A–25I which contain a plurality of gas-liquid contact means such as glass beads where droplets of moisture are coalesced and drop out and are returned to separator 22A–22I respectively. The thus-treated sample is next dried in a cartridge-type drier containing a suitable desiccant in drier unit 26A–26I. Drying column 25A–26I can be loaded with any suitable desiccant such as Drierite ($CaSO_4$), $CaCl_2$, $BaO_2$, and the like. The dried sample streams are then passed to storage vessel 27A–27H, with the exception of stream 9 which is passed directly to analyzer 42.

Each of the eight sample streams passed through storage vessel 27A–27H is passed through a solenoid valve 28A–28H respectively. The effluent line from the sample storage vessel 27A–27H also contains solenoid valve 29A–29H respectively. Solenoid valves 28 and 29 can be remotely energized and de-energized and the valves serve to allow the sample stream to be admitted and removed from the respective storage vessel. In actual operation, when samples are being taken from eight of the sample points A1–A11, solenoid valves 29A–29H are normally closed and solenoid valves 28A–28H are open to allow the sample streams to be admitted to the storage vessels. However, if desired, at the beginning of the sampling cycle, valves 29A–29H can also be opened to allow purging of the system and the sample streams are vented as described hereinbelow.

Further, according to the invention, a manifold assembly 30 is provided for sequentially passing samples from storage vessels 27A–27H to an analyzer. Manifold assembly 30 contains solenoid valves 33A–33H and 34A–34H and vents 31 and 32. Solenoid valves 33A–33H are connected further to vent 31, each connection having a block valve between the vent and solenoid valve. These block valves have not been numbered on the drawing. Similarly, solenoid valve 34A–34H are connected to vent 32 and each connection has a block valve (not numbered) between the solenoid valve and vent line. The vent lines are normally in communication with the effluent from storage vessels 27A–27H when the system is purged prior to trapping samples in the storage vessels.

As indicated previously, individual sample streams can be sequentially passed from their respective storage vessel through manifold assembly 30, line 35, solenoid valve 36, and line 38 to suitable analyzers. A standard sample can be introduced through solenoid valve 36 by way of line 37 as desired. The sample streams can be passed to analyzers 39, 40 and 41 via line 38 as dictated by programmer 43 for the desired analytical sequence. In the embodiment described, analyzer 39 can determine the 1-butene and n-butane concentrations in the sample stream being analyzed. Chromatographic analyzer 40 can perform an exhaustive analysis of each sample, determining the concentrations of methane, the various $C_2$, $C_3$, $C_4$ and $C_5$ paraffin, olefin and diolefin isomers present, usually more than twelve different components. Analyzer 41 can determine the concentrations of lighter components such as hydrogen and methane in the sample stream being analyzed. The analyses by analyzers 39 and 41 can be used to resolve compositional inaccuracies that analyzer 40 is incapable of resolving. To accomplish these related actions, programmer 43 is utilized to sequentially actuate solenoid valves 33 and 34 in manifold assembly 30 to pass a desired sample stream to be analyzed in analyzers 39, 40 and 41. Programmer 43 can also be connected, if desired, to the sample stream switching valves 24 or other solenoid valves near the sample points (not shown) to operate the valves and simultaneously remove sample streams from the process, passing the streams to the storage vessels through the treating zones as previously described. The sampling, treating and analyzing cycle of programmer 43 may be initiated by a digital data gathering and computing system if desired.

Sample stream A10, via conduit 9, is a stream obtained from the reactor effluent which is passed to analyzer 42, continuously or repetitively depending upon the time behavior of analyzing means 42 employed, to provide a continuing record of the butadiene concentration in the effluent.

In actual operation, the sampling system is programmed so that all of the samples can be obtained simultaneously from the chosen sampling points, passed simultaneously through the treating sections to remove contaminants, and all passed separately to storage. Normally, upon initial flow of samples, solenoid valves 28, 29, 33 and 34 would be opened to allow purging of the system with the sample streams. After the system has been purged, solenoid valves 29, 33 and 34 are closed and sample streams are then trapped in storage vessels 27A–27H. Upon trapping the desired quantity of samples, solenoid valves 28 are energized to the closed position and at a desired later time, solenoid valves 33 and 34 are sequentially energized to the open position to allow passage of individual sample streams that have been stored to the analyzers. By flowing the sample streams to purge the system and then trapping the samples simultaneously, a profile of the entire system can be obtained with the same time base. As indicated previously, each individual sample is then selected for analysis from the storage vessels by programmer 42. The analyzers employed are preferably chromatographic analyzers, although other suitable analyzers can be employed.

This invention discloses a system adapted to prepare a number of samples for analysis, e.g., chromatography, so that the end result will be an analytical profile across an entire system. In the embodiment previously described, a sampling system provides an analytical profile across a butene dehydrogenation system.

It should be realized by those skilled in the art that following the analysis of the individual sample streams as described above, the composition measurements thus produced, can be employed for controlling one or more process variables.

It will thus be apparent that the sampling system is capable of automatically scanning a plurality of sample lines so that an accurate analysis of the sample in each line can be obtained. Further, an important feature of the invention is that a plurality of samples are collected simultaneously for subsequent sequential analysis by means of a system of solenoid valves and storage reservoirs for the individual sample streams.

Reasonable variaton and modification are possible withing the scope of this disclosure and the appended claims to the invention, the essence of which is that a method and apparatus are provided for a sampling system for taking a plurality of samples simultaneously, treating to remove contaminants and storing of treated streams separately, and then analyzing the stored samples sequentially at a later time.

I claim:
1. A method of obtaining an analytical profile across a reaction process system which comprises simultaneously obtaining a plurality of sample streams from said process system, passing each sample stream obtained through a series of treating zones to remove moisture, solids, and other contaminants therefrom, separately storing each treated sample stream, and sequentially analyzing the individual stored samples to obtain said profile.

2. A method of obtaining an analytical profile across a $C_4$ hydrocarbon dehydrogenation process wherein a feed is passed through a catalytic reactor and dehydrogenation effluent is subsequently collected which comprises
    (a) simultaneously obtaining a plurality of sample streams spaced along the flow of reactants in said process, samples being taken from the influent feed, products, and at a plurality of points along the length of the reactor,
    (b) passing each sample stream obtained in step (a) through a series of treating zones to remove moisture solids and other contaminants therefrom,
    (c) separtely storing each sample thus treated, and
    (d) sequentially analyzing each stored sample to determine the composition of each sample thereby obtaining said profile across said dehydrogenation process which is representative of the composition at any given period of time.

3. A sampling system for obtaining an analytical profile across a reaction process comprising
    (a) a plurality of sampling probes spaced one from another for withdrawal of sample streams from a plurality of different locations,
    (b) valve means for simuleaneously controlling the withdrawal of samples through said probes,
    (c) means for cleaning solids and liquids from each sample stream,
    (d) means for separately storing each cleaned sample stream,
    (e) manifold means connected to each of said storing means and an analyzer, and
    (f) valve means connected to said manifold adapted to pass each sample stream sequentially from said storing means to said analyzer.

4. A sampling system for obtaining an analytical profile across a reactor comprising in combination
    (a) a reactor,
    (b) influent and effluent lines connected to said reactor,
    (c) a plurality of sampling probes spaced along the length of said influent and effluent lines and said reactor,
    (d) separate conduit means connected to said probes, and means for cleaning said samples,
    (e) solenoid operated valve means connected to each of said separate conduits adapted to control the simultaneous withdrawal of samples from all probes,
    (f) storage means connected to said cleaning means to individually store each cleaned sample,
    (g) analyzer means adapted to determine the composition of said samples,
    (h) manifold means connected to each of said storage means and said analyzer means adapted to control the sequential withdrawal of stored samples and pass same to said analyzer, and
    (i) programming means connected to said solenoid operated valve means and said manifold means adapted to simultaneously withdraw samples and sequentially pass stored samples to said analyzer.

5. A method of obtaining an analytical profile across a process system which comprises
    (a) simultaneously obtaining a plurality of sample streams from said process system,
    (b) passing each sample through a series of steps comprising moisture and solids removal, coalescing, and adsorption drying,
    (c) separately storing said sample stream, and
    (d) sequentially analyzing the individual stored samples to obtain said profile.

6. A method of obtaining an analytical profile across a process system by simultaneously trapping a plurality of spaced samples and subsequently analyzing said samples individually so as to obtain a composition profile of the entire system with substantially the same time basis which comprises:
    (a) simultaneously obtaining a plurality of fluid sample streams at spaced sample points across said process system,
    (b) simultaneously withdrawing said fluid sample streams from the sample points and passing same to storage,
    (c) separately storing each fluid sample stream in a separate fluid storage zone remote from each sample point, and
    (d) sequentially analyzing the individually stored fluid samples to obtain said profile.

7. Method occording to claim 6 wherein the fluid samples passed from the sample points to storage are treated in such a manner as to remove moisture and solids contaminants therefrom without substantially altering the composition of the fluid samples obtained.

References Cited
UNITED STATES PATENTS

| | | | |
|---|---|---|---|
| 2,781,663 | 2/1957 | Maly et al. | 73—421 |
| 2,709,678 | 5/1955 | Work et al. | 202—35 |
| 3,091,968 | 6/1963 | Platzer | 73—425.1 |

LOUIS R. PRINCE, *Primary Examiner.*

S. C. SWISHER, *Assistant Examiner.*